United States Patent
Mellia et al.

(10) Patent No.: US 8,144,614 B2
(45) Date of Patent: Mar. 27, 2012

(54) METHOD AND APPARATUS FOR DETECTING VOCAL DATA FLOW IN A PACKET DATA FLOW

(76) Inventors: Marco Mellia, Turin (IT); Dario Rossi, Turin (IT); Michela Meo, Turin (IT); Massimo Perino, Ivrea (IT)

( * ) Notice: Subject to any disclaimer, the term of this patent is extended or adjusted under 35 U.S.C. 154(b) by 242 days.

(21) Appl. No.: 12/519,924

(22) PCT Filed: Dec. 14, 2007

(86) PCT No.: PCT/IB2007/003905
§ 371 (c)(1),
(2), (4) Date: Jun. 18, 2009

(87) PCT Pub. No.: WO2008/075167
PCT Pub. Date: Jun. 26, 2008

(65) Prior Publication Data
US 2010/0214933 A1 Aug. 26, 2010

(30) Foreign Application Priority Data
Dec. 18, 2006 (IT) .............................. MI2006A2417

(51) Int. Cl.
*H04L 12/26* (2006.01)
(52) U.S. Cl. ...................................... 370/252
(58) Field of Classification Search ......................... None
See application file for complete search history.

(56) References Cited

U.S. PATENT DOCUMENTS

| 6,775,265 B1* | 8/2004 | Oran ............................. 370/352 |
| 7,701,981 B2* | 4/2010 | Kapoor et al. ................ 370/516 |
| 2008/0165791 A1* | 7/2008 | DeGrazia ...................... 370/412 |
| 2009/0003377 A1* | 1/2009 | Andersson et al. ........... 370/464 |

OTHER PUBLICATIONS

Moore A W et al: "Internet Traffic Classification Using Bayesian Analysis Techniques", SIGMETRICS 2005 / Performance Evaluation Review. International Conference on Measurement and Modeling of Computer Systems. Proceedings, Banff, Alberta, Canada, (Jun. 6-10, 2005); [Proceedings of the ACM SIGMETRICS International Conference on Measureme, pp. 50-60.
Sun K et al: "Characterizing and Detecting Skype-Relayed Traffic", INFOCOM 2006. 25th IEEE International Conference on Computer Communications. Proceedings, IEEE, PI, (Apr. 1, 2006), pp. 1-12.

* cited by examiner

*Primary Examiner* — Hassan Phillips
*Assistant Examiner* — Duc Duong
(74) *Attorney, Agent, or Firm* — B. Aaron Schulman, Esq.; Stites & Harbison, PLLC

(57) ABSTRACT

The invention concerns a method and an apparatus for detecting vocal data flow in a packet data flow characterised by at least two measurable variables (X5Y). A distribution function (P{x 1 C}, P{y I C}) is provided of the values of each variable (X5Y) in a vocal data flow, and the values (x,y) of each variable (X,Y) are measured in order to obtain a sequence of measured values ($x^{(k)}$, $y^{(k)}$) on a number (k) of blocks. Each measured value ($x^{(k)}$, $y^{(k)}$) is therefore applied to the respective distributiion function (P{x 1 C}, P{yI C}) in order to generate a sequence of likelihood values Formula (I) from which respective average likelihood values (E [$B_x$],E[$B_y$]) are generated. The average values are processed in order to generate a reference likelihood value (B) which, when compared with a threshold likelihood value ($B_{min}$) enables the presence of vocal data flow in a packet data flow to be detected.

20 Claims, 3 Drawing Sheets

METHOD AND APPARATUS FOR DETECTING VOCAL DATA FLOW IN A PACKET DATA FLOW

The present invention concerns a method for detecting vocal data flow in a packet data flow.

The problem of detecting vocal data flow in a packet data flow or voice traffic in traffic on an IP network is known in the current state of the art.

This problem is known in particular with reference to VoIP telephony wherein a vocal communication is established on an IP network between two users. A typical example of software that generates vocal data flow on an IP network is Skype.

The protocols and algorithms that enable Skype, like most vocal programmes, to generate vocal data flow on an IP network, are known and encrypted.

For this reason it is very difficult to detect the presence of vocal data flow, such as Skype, in an aggregate data flow comprising flows of various types: vocal, data, video, etc.

The above situation demonstrates a need to be able to detect the presence of vocal data flow in a packet data flow when the protocols and algorithms used to generate the vocal data flow are not known, and to include this vocal flow in the packet data flow.

In view of the state of the art described, the object of the present invention is to devise a method and apparatus for identifying vocal data flow in a packet data flow which is capable of overcoming the drawbacks that exist in the known art.

According to the present invention, this object is achieved by a method for identifying vocal data flow in a packet data flow according to claim 1.

According to a further aspect, this object is achieved by an apparatus for identifying vocal data flow in a packet data flow according to claim 12.

Thanks to the present invention it is possible to obtain a method and an apparatus capable of detecting vocal data flow in an aggregate flow on an IP network by using a simple technique.

Figure 1:
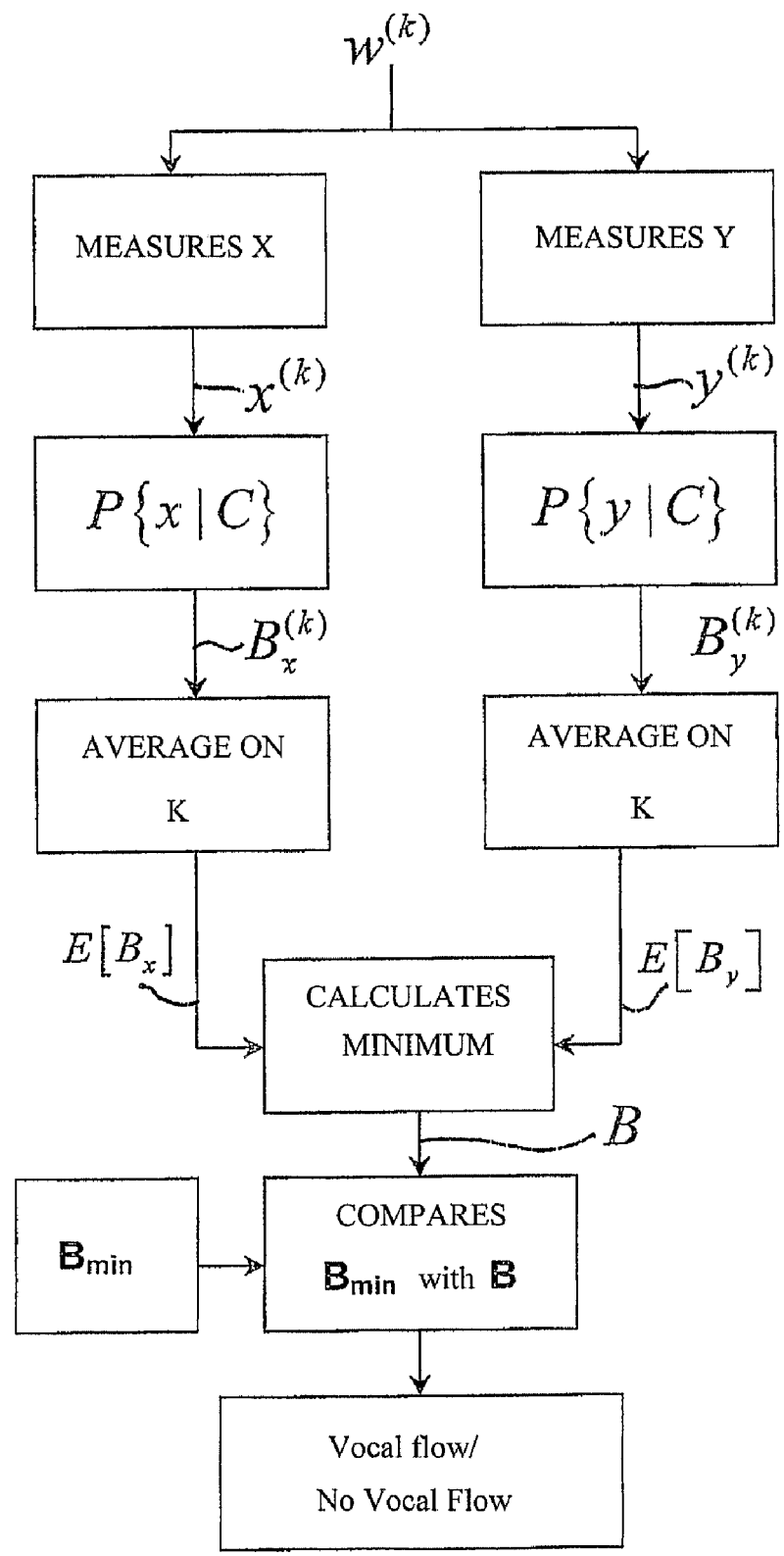
Figure 2:
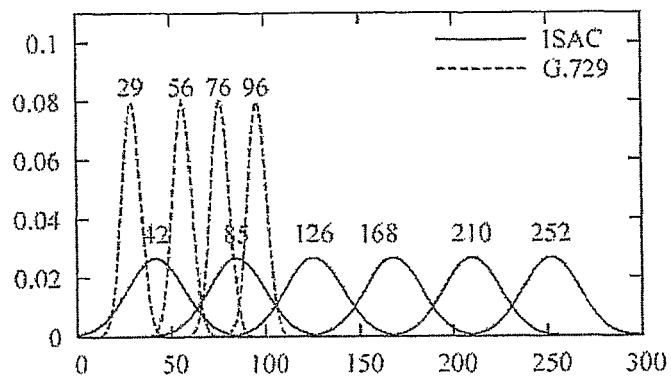
Figure 3:
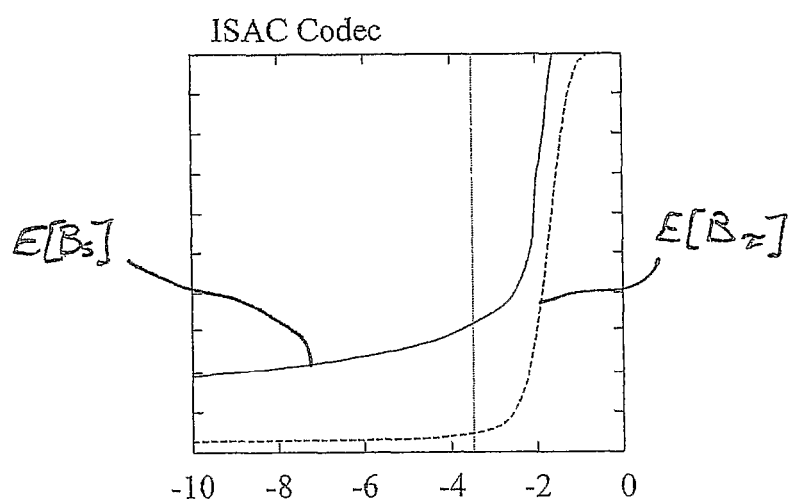
Figure 4:
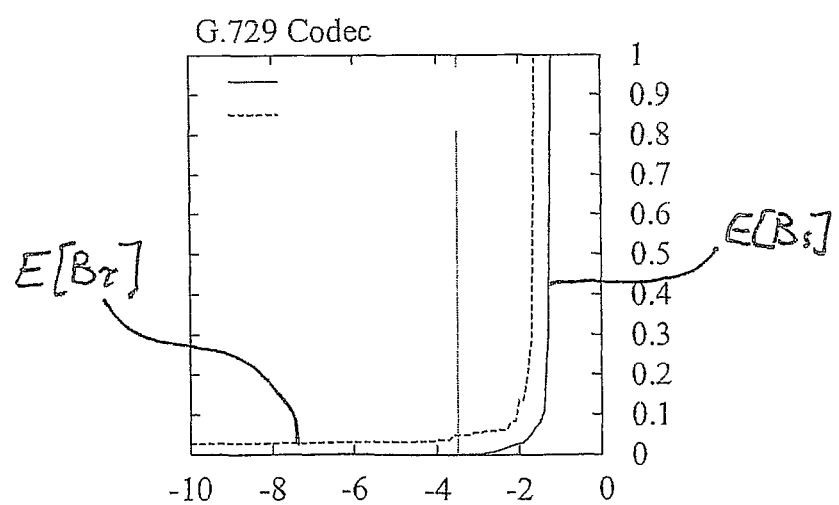
Figure 5:
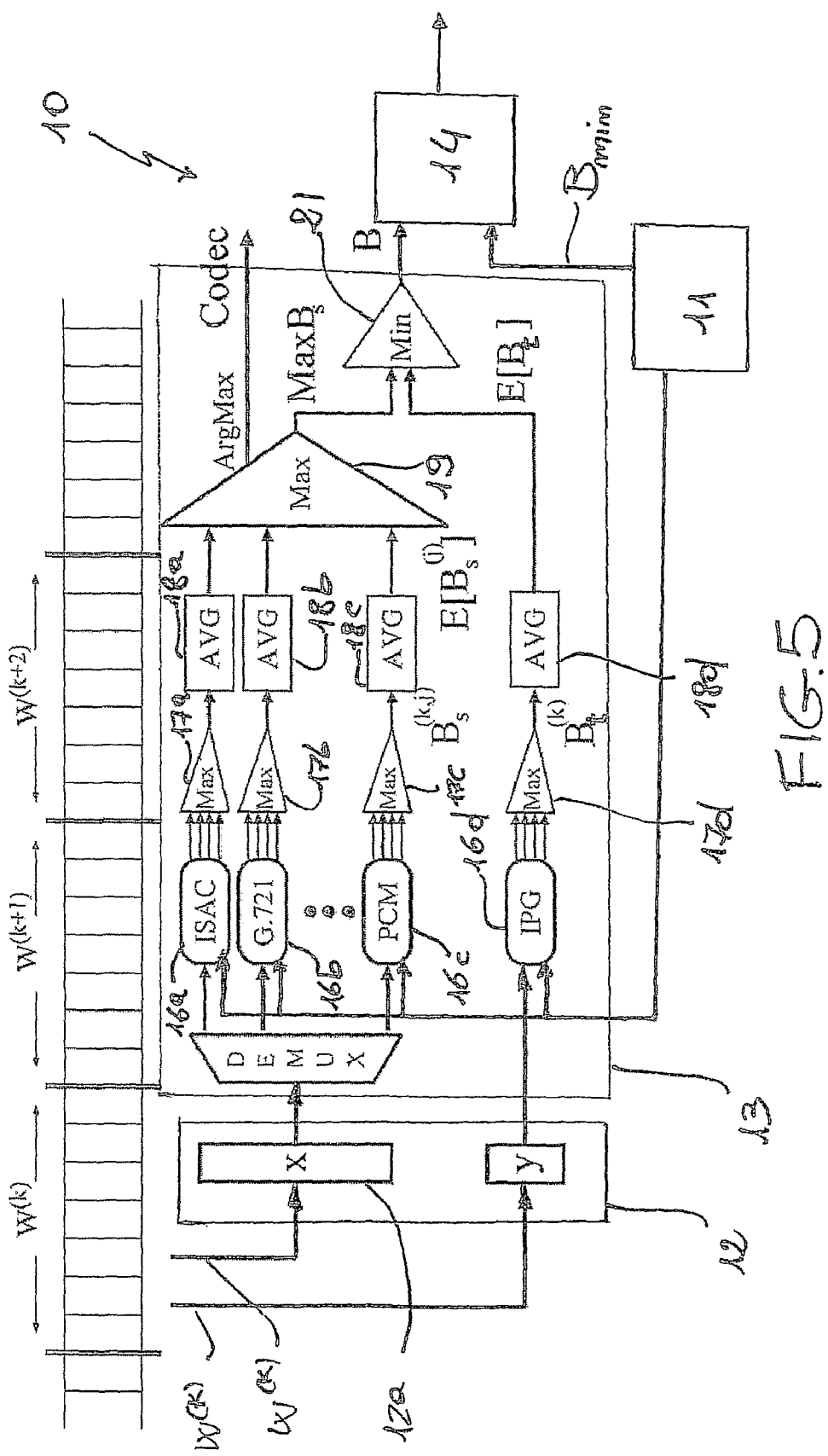

Further features and advantages of the method and apparatus according to the present invention will emerge from the following description of a preferred embodiment, given by way of example and in no way limiting, and with reference to the accompanying drawings, in which:

FIG. 1 shows an explanatory schematic diagram of the method of detecting vocal data flow in a packet data flow according to the present invention, FIG. 2 shows likelihood functions used in an embodiment of the method according to the present invention, FIGS. 3 and 4 show belief distributions obtained during the method described in the present invention, FIG. 5 shows a block diagram of an apparatus for detecting vocal data flow in a packet data flow according to the present invention.

In the course of the present description, the likelihood or belief function used in the Naive Bayes Classifier technique shall be adopted. The Naive Bayes Classifier technique will now be described in order to make the following description of the invention clearer.

The Naive Bayes Classifier (NBC) technique is based on Bayes' Theorem. In fact, it treats the observation of an object that can be described by a plurality of observable or measurable quantities, referred to in the present invention as measurable variables.

Given a measurable variable X of an object under observation, we can obtain different samples of the variable X, which can be described by means of the vector $x=[x_i]$, in which $x_i$ is the $i^{th}$ value of the measured variable X. What is pertinent as regards the present invention is determining the probability $P\{C|x\}$ that the object belongs to a Class C having observed or measured a sequence of values x of the measurable variable X. The NBC technique is thus based on an a priori knowledge of the probability $P\{x|C\}$ in order to determine the a posteriori probability $P\{C|x\}$, in which $$P\{C|x\} = \frac{P\{C,x\}}{P\{x\}} = \frac{P\{C,x\}}{P\{x\}} \frac{P\{C\}}{P\{C\}} = \frac{P\{x|C\}}{P\{x\}} P\{C\}. \quad (1)$$

The NBC technique is based on the theory that the measured values $x_i$ of the variable X are independent so that $$P\{x|C\} = \prod_i P\{x_i|C\}. \quad (2)$$

In some cases, instead of estimating the probability $P\{C|x\}$, it is possible to find out the likelihood that the object belongs to class C rather than to other classes, so that a criterion of maximum likelihood can be used in which $P\{C|x\} \propto P\{x|C\}$. $P\{x|C\}$ is referred to in literature as likelihood or belief. The greater the belief for a given class, the greater the probability that the object belongs to that given class.

In order to detect the presence of vocal data flow in a packet data flow it is necessary to identify a number of measurable variables of the packet data flow and calculate the belief that each variable belongs to a vocal data flow.

The packet data flow is divided into packet blocks $w^{(k)}$, each block w comprising a predefined number of packets.

With reference to the accompanying Figures, the method for detecting the vocal data flow in a packet data flow comprises the steps of:

a) providing, for each measurable variable X, Y at least one function $P\{x|C\}$, $P\{y|C\}$ representative of the distribution of the values of the respective variable X, Y in a vocal data flow, b) measuring, for each block $w^{(k)}$ of a predefined number K of blocks of packet data flow, at least one value x, y of each variable X, Y in order to obtain, for each variable X, Y, a sequence of measured values $x^{(k)}$, $y^{(k)}$ on the predefined number K of blocks;

c) applying, for each variable X, Y, each measured value $x^{(k)}$, $y^{(k)}$ of the sequence of measured values of the variable to the respective distribution function $P\{x|C\}$, $P\{y|C\}$ in order to generate a sequence of likelihood values $B_x^{(k)}$, $B_y^{(k)}$, d) processing, for each variable X, Y, the respective sequence of likelihood values $B_x^{(k)}$, $B_y^{(k)}$, in order to generate the respective average likelihood value $E[B_x]$, $E[B_y]$ on the predefined number K of blocks, e) processing the average likelihood values $E[B_x]$, $E[B_y]$ generated for each X, Y variable in order to generate a reference likelihood value B;

f) comparing the reference likelihood value B with a threshold likelihood value $B_{min}$ in order to detect the presence of vocal data flow in the predefined number K of blocks of the packet data flow to be analysed.

In particular, the presence of vocal data flow is detected when the reference likelihood value B is greater than the threshold likelihood value $B_{min}$.

Advantageously, the processing step e) includes the step of calculating the minimum value min ($E[B_x], E[B_y]$) of the average likelihood values $E[B_x]$, $E[B_y]$ generated for each variable X, Y in order to generate the reference likelihood value B.

In order to provide the distribution function of each measurable variable X, Y, step a) includes the steps of:
 a1) providing a packet vocal data flow;
 a2) measuring, for each variable X, Y, the values of the variable in the packet vocal data flow in order to obtain the distribution function of the variable P{x|C}, P{y|C}.

If the vocal data flow is generated by a plurality of voice codecs and the values assumed by at least one variable X depend on the voice codec, step a) of the method includes, for the purpose of providing the distribution function of this measurable variable X, the steps of:
 a1) providing a plurality of packet vocal data flows, each flow being generated by one respective voice codec of the plurality of voice codecs;
 a2) measuring, for at least one variable X, the values of the variable X in each packet vocal data flow in order to obtain the distribution function $P_j\{x|C\}$ of the variable X for each voice codec j.

If each voice codec has a plurality of operating configurations, step a2) includes the measurement step, for at least one variable X, for each operating configuration of each voice codec, of the values of the variable X in each packet vocal data flow in order to obtain a distribution function of the variable X for each operating configuration of each voice codec j.

In the above-mentioned case, the successive steps c) and d) are performed for at least one variable X and for each codec (j) in order to generate an average likelihood value $E[B_x^{(j)}]$ for each codec.

In particular, step c) includes the steps of:
 c1) applying each measured value of the sequence of measured values of at least one variable X depending on the voice codec to the distribution function of each operating configuration of the respective voice codec in order to generate a plurality of likelihood values, and
 c2) calculating, for each measured value of the sequence of measured values, the maximum of the plurality of likelihood values in order to generate the sequence of likelihood values $B_x^{(k,j)}$.

In this case, step d) includes the steps of:
 d1) processing for at least one variable X and for each codec j, the respective sequence of likelihood values $B_x^{(k,j)}$ in order to generate the respective average likelihood value $E[B_x^{(j)}]$;
 d2) processing the average likelihood values generated for each codec $E[B_x^{(i)}]$ for at least one variable X in order to generate the average likelihood value $E[B_x]$ on the predefined number K of blocks.

According to a preferred embodiment and as shown in the example given below, step d2) includes the step of calculating the maximum of the average likelihood values generated for each codec $E[B_x^{(j)}]$ in order to generate the average likelihood value $E[B_x]$ on the predefined number K of blocks, where $$E[B_x] = \max_j(E[B_x^j]). \tag{3}$$

The method of the present invention also enables the maximum likelihood codec to be found. For this purpose, a step is included that involves finding the codec j associated with the maximum of the likelihood values $E[B_x^{(j)}]$ generated for each codec j, this codec j representing the maximum likelihood voice codec of the vocal data flow.

With reference to FIG. 1, there now follows a description of the application of the method according to the invention in order to detect Skype vocal data flow in a packet data flow.

As Skype is a closed and proprietary programme, it is not possible to decode a data flow generated by Skype in order to detect the presence of vocal data flow.

According to the method of the present invention, at least two measurable variables of a packet data flow must be selected. Advantageously, the measurable variables chosen must be capable of differentiating Skype vocal flow from normal Internet flow on an IP network.

Considering the nature of voice communication in real time, a Skype flow will generate a low-rate bit flow lasting a few tenths of a second and comprising a high number of brief messages, the size of which depends on the sampling rate of the codec and the period of time that elapses between two consecutive messages belonging to the same data flow. By contrast, a data flow tends to have long messages and high bit rates.

Consequently, the following measurable variables have been chosen:
 size of the message, or length of the payload incorporated into the transport level protocol packet. In particular, a window or packet block of messages w is considered and for each message the size of the packet is measured. This therefore gives:

$$x = [s_1, s_2, \ldots, s_w] \tag{4}$$

in which $s_i$ is the size of the message of the $i^{th}$ packet of a window of consecutive packets w. Since the size of the message depends heavily on the specific codec, a distribution function for each of the codecs supported by Skype is required;
 the average inter-packet gap (IPG), regarded as the interval of time between the instant at which the first packet and the $w^{th}$ packet are received within a window or packet block. This therefore gives:

$$y = [\tau] = \left[\frac{(t_w - t_1)}{w}\right] \tag{5}$$

In this case, there is only one classifier or distribution function since the average IPG is independent of the codec used.

In order to optimise numeric and normalisation calculations, $B_s$ is defined as the belief of the message size variable and $B_\tau$ is defined as the belief of the average IPG variable, where $$B_s(C) = \frac{1}{w}\sum_{i=1}^{w} \log P\{s_i \mid C\} \tag{6}$$

and $$B_\tau(C) = \log P\{\tau \mid C\}. \tag{7}$$

It is helpful to remember that the logarithmic operator has been inserted only for the purposes of numeric calculation since the values of the functions P{$s_i$|C}, P{τ|C} are extremely small while their logarithm enables easier management on the level of numeric calculation.

It should also be noted that the above-mentioned measurable variables have been chosen as variables in a reduced window of samples, so as to compensate for the effect of the high variability of the flow. For the choice of the value w of windows, it has been found that its value has no influence on the final calculation for values greater than 10. In the example described below, w has been set at 30 which roughly corresponds to a window of 1 second.

A Skype flow source is then provided and the message size variable in the Skype flow is measured in order to obtain the distribution of the values of the message size variable for each codec. As is known, a codec can operate at different operating points that correspond to different settings of various parameters of the codec, for example the rate of sampling, the size of the header, the redundancy factor and the message framing time. For each combination of values of the above-mentioned parameters, the distribution of the message size is represented by a Gaussian curve $N(\mu,\sigma)$ where $\mu$ is the average value and $\sigma$ is the standard deviation.

FIG. 2 shows an example of message size distribution curves for various operating points of ISAC and G.729 codecs. Each Gausssian curve represents an operating point of the codec, or one class as regards the NBC technique.

The same method is adopted to find the distribution curve of the average IPG values, represented by a Gaussian curve with an average value of $\mu$ equal to the framing time $\Delta T$ and standard deviation $\sigma=3$ regardless of the codec.

Subsequently, having taken a data flow to be analysed, the values of the two variables chosen, the message size and the average IPG, are measured.

Message Size

The message size is measured for each measurement window w. In each window w, for each codec j, the message size is measured and this value is applied to the distribution functions of the message size and the maximum $B_s^{(k,j)}(C)$ is chosen as a belief value between the class C beliefs of the distribution curves, or the different operating points of the $j^{th}$ codec. This maximum value is indicated by $B_s^{(k,j)}$.

By repeating this measurement on all of the windows, a belief sequence is generated for each codec.

The belief value of the flow for the codec j is obtained by calculating the average value on k of belief $B_s^{(k,j)}$ of the codec j, which gives $$E[B_s^{(j)}]=E_k[B_s^{(k,j)}] \quad (8).$$

In order to find the average belief $E[B_s]$ for the message size variable, the maximum is calculated between the beliefs $E[B_s^{(j)}]$, which gives $$E[B_s] = \text{Max}B_s = \max_j(E[B_s^{(j)}]). \quad (9)$$

The maximum likelihood codec is therefore the codec j associated with Max $B_s$ or $$codec = \text{argmax}(\max_j(E[B_s^{(j)}])). \quad (10)$$

Basically, first and foremost the temporal trend of the beliefs for each codec is obtained and then the average value for each codec is calculated so as to obtain the belief value of each codec. In this way, it is possible to determine which codec has the greatest belief or the maximum likelihood.

Average IPG

The same procedure applies to the average IPG except that the average IPG value is independent of the codecs used. For each window k, belief $B_\tau^{(k)}$ is obtained. The belief value of the flow is obtained by calculating the temporal average so as to obtain the average belief value $E[B_\tau]$, where $$E[B_\tau]=E_k[B_\tau^{(k)}] \quad (11).$$

In order to decide whether the flow has been generated by Skype, the classifiers of the message size and the average IPG are found by calculating the minimum B of the average beliefs $E[B_s]$, $E[B_\tau]$, where $$B=\min(E[B_s], E[B_\tau]) \quad (12)$$

represents the reference belief value.

Lastly, value B of the reference belief value is compared with a threshold belief value $B_{min}$ in order to determine whether the flow is a Skype flow.

Various experiments have been carried out to analyse the impact of the threshold belief value $B_{min}$.

The experiments performed have shown that the distribution of the belief value has a "knee" region in which the derivative before distribution shifts from very low values to values tending to infinity (FIGS. 3 and 4). This region greatly simplifies the setting of the threshold belief value $B_{min}$.

With reference to FIGS. 3 and 4, the continuous line represents belief $E[B_s]$, while the dotted line represents belief $E[B_\tau]$ for two different codecs, namely ISAC codec and G.729 codec.

The present invention also concerns an apparatus 10 for detecting vocal data flow in a packet data flow divided into packet blocks $w^{(k)}$, each block w comprising a predefined number of packets (FIG. 5).

The apparatus 10 comprises storage means 11 capable of providing, for each measurable variable X, Y, at least one, function $P\{x|C\}$ $P\{y|C\}$ representative of the distribution of the values of the respective variable X, Y in a vocal data flow.

The apparatus 10 also comprises measuring means 12 capable of receiving packet data flow in order to measure, for each block $w^{(k)}$ of a predefined number K of blocks of packet data flow, at least one value x, y of each variable X, Y so as to obtain, for each variable X, Y, a sequence of $x^{(k)}$, $y^{(k)}$ measured values for the predefined number K of blocks.

The apparatus 10 also comprises processing means 13 connected to the storage means 11 and the measuring means 12 and capable of:
  applying, for each variable X, Y, each measured value $x^{(k)}$ $y^{(k)}$ of the sequence of measured values of the variable at the respective distribution function $P\{x|c\}$, $P\{y|C\}$ in order to generate a sequence of likelihood values $B_x^{(k)}$, $B_y^{(k)}$,
  processing, for each variable X, Y, the respective sequence of likelihood values $B_x^{(k)}$, $B_y^{(k)}$ in order to generate the respective average likelihood value $E[B_x]$, $E[B_y]$ on said predefined number K of blocks, and
  processing the average likelihood values $E[B_x]$, $E[B_y]$ generated for each variable X, Y in order to generate a reference likelihood value B.

Lastly, the apparatus comprises comparison means 14 connected to the processing means 13 and capable of comparing the reference likelihood value B with a likelihood threshold value $B_{min}$ so as to detect the presence of vocal data flow in packet data flow, particularly in the predefined number K of blocks. In the embodiment, likelihood threshold value $B_{min}$ is stored in the storage means 11. Alternatively this threshold value can be stored in other storage means connected to the comparison means 14.

Depending on the comparison, the comparison means 14 are capable of generating a value on the basis of which it is possible to establish whether vocal data flow is present in packet data flow, particularly in the predefined number K of blocks.

Advantageously, the processing means 13 are capable of calculating the minimum of the average likelihood values $E[B_x]$, $E[B_y]$ generated for each variable X, Y in order to generate the reference likelihood value B.

If the vocal data flow is generated by a plurality of voice codecs j and at least one variable X is dependent on the voice codec, the storage means 11 provide the distribution function $P_j\{x|C\}$ of the variable X for the respective voice codec j.

More particularly, when each voice codec j has a plurality of operating configurations, the storage means 11 provide a distribution function of the variable X for each operating configuration of the respective voice codec j.

In this case, the processing means 13 are capable of:
applying each measured value of the sequence of measured values of at least one variable X dependent on the voice codec to the distribution function of each operating configuration of the respective voice codec in order to generate a plurality of likelihood values, and
calculating, for each measured value of the sequence of measured values, the maximum of the plurality of likelihood values in order to generate the sequence of likelihood values $B_x^{(k,j)}$.

Furthermore, the processing means 13 are capable of:
processing, for at least one variable X and for each codec j, the respective sequence of likelihood values $B_x^{(k,j)}$ in order to generate the respective average likelihood value $E[B_x^{(j)}]$, and
processing the average likelihood values generated for each codec $E[B_x^{(j)}]$ for at least one variable X in order to generate the average likelihood value $E[B_x]$ on the predefined number K of blocks.

In particular, the processing means 13 are capable of calculating the maximum of the average likelihood values generated for each codec $E[B_x^{(j)}]$ in order to generate the average likelihood value $E[B_x]$ on the predefined number K of blocks, where $E[B_x]=\text{Max}(E[B_x^j])$ as defined above by relation (3).

The apparatus 10 also enables the maximum likelihood codec to be found. For this purpose, the processing means 13 are capable of finding the codec j associated with the maximum of the likelihood values $E[B_x^{(j)}]$ generated for each codec j, this codec j representing the maximum likelihood voice codec of the vocal data flow.

With reference to the embodiment shown in the accompanying Figures, the measuring means 12 of the apparatus 10 comprise first measuring means 12a capable of measuring the message size and second measuring means 12b capable of measuring the average IPG.

The output signal from the first measuring means 12a is split by a demultiplexer 15 and sent to a plurality of likelihood calculation blocks 16a, 16b, 16c, one for each codec j, each representing an NBC.

The probability distribution functions $P_j\{s_i|C\}$ of the message size variable of each codec j are stored in the storage means 11 connected to each likelihood calculation block 16a, 16b, 16c.

The likelihood calculation blocks 16a, 16b, 16c apply to each message size measurement value input into the respective probability distribution functions $P_j\{s_i|C\}$ of the message size of the respective codec j.

The output values from the likelihood calculation blocks 16a, 16b, 16c are input into the respective maximum calculation blocks 17a, 17b, 17c which calculate as belief value $B_s^{(k,j)}$ the maximum $B_s^{(k,j)}(C)$ among the class C beliefs of the distribution curves $P_j\{s_i|C\}$.

The belief values $B_s^{(k,j)}$ are then input into the respective average value calculation blocks 18a, 18b, 18c which calculate the average value on k of the beliefs $B_s^{(k,j)}$ of each codec j. The calculation blocks 18a, 18b, 18c will therefore output values $E[B_s^{(j)}]=E_k[B_s^{(k,j)}]$.

In order to find the average belief $E[B_s]$ for the message size variable, the apparatus 10 comprises a calculation block 19 capable of calculating the maximum value between the beliefs $E[B_s^{(j)}]$ output from the calculation blocks 18a, 18b, 18c from which $$E[B_s] = \text{Max}B_s = \max_j(E[B_s^{(j)}])$$

is obtained.

The calculation block 19 also enables the maximum likelihood codec to be determined, that is the codec j associated with the Max $B_s$, or the codec j that satisfies the relation $$codec = \text{argmax}(\max_j(E[B_s^{(j)}])).$$

The probability distribution functions $P\{\tau|C\}$ of the average IPG variable are stored in the storage means 11.

The apparatus also comprises a likelihood calculation block 16d into which the average IPG values measured by the second measuring means 12b are input thereby, such calculation block 16d representing an NBC.

The values output by the likelihood calculation block 16d are input into a maximum calculation block 17d which calculates as belief value $B_\tau^{(k)}$ the maximum $B_\tau^{(k)}(C)$ among the class C beliefs of the probability distribution curves $P\{\tau|C\}$.

The belief values $B_\tau^{(k)}$ are then input into an average value calculation block 18d which calculates the average value on k of the beliefs $B_\tau^{(k)}$. Calculation block 18d will therefore output the average value of belief $E[B_\tau]$, where $E[B_\tau]=E_k[B_\tau^{(k)}]$.

In order to decide whether the flow has been generated by Skype, the output of the calculation block 18d, or the average value of belief $E[B_\tau]$, and the output of calculation block 19, or the average belief value $E[B_s]$, are input into a calculation block 21 which calculates the minimum B of the average beliefs $E[B_s]$, $E[B_\tau]$, where $B=\min(E[B_s], E[B_\tau])$ represents the reference belief value.

This reference belief value B is then compared by the comparator 14 with a threshold belief value $B_{min}$ to establish whether the flow is a Skype flow.

As can be appreciated from the above description, the method according to the present invention makes it possible to meet the requirements and to overcome the drawbacks referred to in the introductory part of the present description with reference to the known art.

In particular, the method and the apparatus according to the invention make it possible to detect the presence of any type of vocal flow, even if it is encrypted.

Clearly, an expert in the field, in order to meet contingent and specific requirements, may make numerous modifications and variations to the method and apparatus according to the above-described invention, all being contained, however, within the scope of protection of the invention as defined by the following claims.

The invention claimed is:

1. Method for detecting vocal data flow in a packet data flow said packet data flow being divided into packet blocks ($w^{(k)}$) each block (w) comprising a predefined number of packets, said data flow having at least two measurable variables (X, Y), said method comprising the steps of:
- a) providing, for each measurable variable (X, Y), at least one function (P {x|C}, P{y|C}) representative of the distribution of the values of the respective variable (X, Y) in a vocal data flow;
- b) measuring, for each block ($w^{(k)}$) of a predefined number (K) of blocks of said packet data flow, at least one value (x, y) of each variable (X, Y) in order to obtain, for each variable (X, Y), a sequence of measured values ($x^{(k)}$, $y^{(k)}$) on the predefined number (K) of blocks;
- c) providing a processor and, in the processor, applying, for each variable (X, Y), each measured value (x(k), y{k}) of the sequence of measured values of the variable to the respective distribution function (P {x|C}, P{y|C}) in order to generate a sequence of likelihood values ($B_x^{(k)}$, $B_y^{(k)}$);
- d) processing, by using the processor, for each variable (X, Y), the respective sequence of likelihood values ($B_x^{(k)}$, $B_y^{(k)}$), in order to generate the respective average likelihood value ($E[B_x]$, $E[B_y]$) on said predefined number (K) of blocks;
- e) processing by using the processor the average likelihood values ($E[B_x]$, $E[B_y]$) generated for each variable (X, Y) in order to generate a reference likelihood value (B); and
- f) comparing said reference likelihood value (B) with a threshold likelihood value (Bmin) in order to detect the presence of vocal data flow in the predefined number (K) of blocks of said packet data flow.

2. Method according to claim 1, wherein the presence of vocal data flow is detected when said reference likelihood value (B) is greater than said threshold likelihood value $B_{min}$.

3. Method according to claim 1, wherein said processing step e) includes the step of calculating the minimum of the average likelihood values ($E[B_x]$, $E[B_y]$), generated for each variable (X, Y) in order to generate the reference likelihood value (B).

4. Method according to claim 1, wherein said step a) of providing at least one distribution function includes the steps of:
- a1) providing a packet vocal data flow,
- a2) measuring, for each measurable variable (X,Y), the values of the variable in said packet vocal data flow in order to obtain the distribution function of the variable (P{x|C}, P{y|C}).

5. Method according to claim 1, wherein said vocal data flow is generated by a plurality of voice codecs Q), at least one variable (X) being dependent on the voice codec, said step a) of providing at least one distribution function includes the steps of:
- a1) providing a plurality of packet vocal data flows, each flow being generated by one respective voice codec of the plurality of voice codecs,
- a2) measuring, for at least one variable (X), the values of the variable (X) in each packet vocal data flow in order to obtain the distribution function ($P_j\{x|C\}$) of the variable (X) for each voice codec.

6. Method according to claim 5, wherein each voice codec has a plurality of operating configurations, said step a2) including the measurement step, for at least one variable (X), for each operating configuration of each voice codec, of the values of the variable (X) in each packet vocal data flow in order to obtain a distribution function of the variable (X) for each operating configuration of each voice codec (j).

7. Method according to claim 5, wherein said steps c) and d) are performed for at least one variable (X) and for each codec Q) in order to generate an average likelihood value for each codec (j).

8. Method according to claim 5, wherein said step c) includes the steps of:
- c1) applying each measured value of the sequence of measured values of at least one variable depending on the voice codec to the distribution function of each operating configuration of the respective voice codec in order to generate a plurality of likelihood values;
- c2) calculating, for each measured value of the sequence of measured values, the maximum of the plurality of likelihood values in order to generate the sequence of likelihood values ($B_x^{(k,j)}$).

9. Method according to claim 8, wherein said step d) includes the steps of:
- d1) processing, for at least one variable (X) and for each codec (j), the respective sequence of likelihood values ($B_x^{(k,j)}$) in order to generate the respective average likelihood value ($E[B_x^{(j)}]$);
- d2) processing the average likelihood values generated for each codec ($E[B_x^{(j)}]$) for said at least one variable (X) in order to generate the average likelihood value ($E[B_x]$) on said predefined number (K) of blocks.

10. Method according to claim 9, wherein said step d2) includes the step of calculating the maximum of the average likelihood values generated for each codec ($E[B_x^{(j)}]$) in order to generate the average likelihood value ($E[B_x]$) on said predefined number (K) of blocks.

11. Method according to claim 10, including furthermore the step of finding the codec (j) associated with the maximum of the likelihood values ($E[B_x]$) generated for each codec ($E[B_x^{(j)}]$), said codec (j) representing the maximum likelihood voice codec of said vocal data flow.

12. Method according to claim 1, wherein said at least two measurable variables are the message size and the average inter packet gap.

13. Apparatus (10) for detecting the vocal data flow in a packet data flow, said packet data flow being divided into packet blocks ($w^{(k)}$) each block (w) comprising a predefined number of packets, said data flow having at least two measurable variables (X, Y), said apparatus (10) being characterised in that it includes:
- storage means (11) capable of providing, for each measurable variable (X, Y), at least one function (P{x|C}, P{y|C}) representative of the distribution of the values of the respective variable (X, Y) in a vocal data flow,
- measuring means (12) capable of receiving said packet data flow in order to measure, for each block ($w^{(k)}$), of a predefined number (K) of blocks of said data flow, at least one value (x, y) of each variable
- (X, Y) so as to obtain, for each variable (X, Y), a sequence of measured values ($x^{(k)}$, $y^{(k)}$) for the predefined number (K) of blocks,
- processing means (13) connected to said storage means (11) and to said measuring means (12) and capable of
- applying, for each variable (X, Y), each measured value ($x^{(k)}$, $y^{(k)}$) of the sequence of measured values of the variable at the respective distribution function (P{x|C}, P{y|C}) in order to generate a sequence of likelihood values ($B_x^{(k)}$, $B_y^{(k)}$),
- processing, for each variable (X, Y), the respective sequence of likelihood values ($B_x^{(k)}$, $B_y^{(k)}$), in order to generate the respective average likelihood value ($E[B_x]$, $E[B_y]$) on said predefined number (K) of blocks, processing the average likelihood values ($E[B_x]$, $E[B_y]$) generated for each variable (X, Y) in order to generate a reference likelihood value (B), comparison means (14) connected to said processing means (13) and capable of comparing said reference likelihood value (B) with a likelihood threshold value ($B_{min}$) so as to detect the presence of vocal data flow in said packet data flow.

14. Apparatus (10) according to claim 13, wherein said processing means (13) are capable of calculating the minimum of the average likelihood values ($E[B_x]$, $E[B_y]$) generated for each variable (X, Y) in order to generate the reference likelihood value (B).

15. Apparatus (10) according to claim 13, wherein said vocal data flow is generated by a plurality of voice codecs (j) and at least one variable (X) is dependent on the voice codec, said storage means 11 being capable of providing the distribution function ($P_j\{x|C\}$) of at least one variable (X) for each voice codec (j).

16. Apparatus (10) according to claim 15, wherein each voice codec Q) has a plurality of the operating configurations, the storage means (11) being capable of providing a distribution function of at least one variable (X) for each operating configuration of each voice codec (j).

17. Apparatus (10) according to claim 16, wherein said processing means (13) are capable of:

applying each measured value of the sequence of measured values of at least one variable (X) depending on the voice codec to the distribution function of each operating configuration of the respective voice codec (j) in order to generate a plurality of likelihood values, and calculating, for each measured value of the sequence of measured values, the maximum of the plurality of likelihood values in order to generate the sequence of likelihood values ($B_x^{(k,j)}$).

18. Apparatus (10) according to claim 17, wherein said processing means (13) are capable of:

processing, for at least one variable (X) and for each codec (j), the respective sequence of likelihood values ($B_x^{(k,j)}$) in order to generate the respective average likelihood value ($E[B_x^{(j)}]$), and processing the average likelihood values generated for each codec ($E[B_x^{(j)}]$) for at least one variable (X) in order to generate the average likelihood value ($E[B_x]$) on the predefined number (K) of blocks.

19. Apparatus (10) according to claim 18, wherein said processing means (13) are capable of calculating the maximum of the average likelihood values generated for each codec ($E[B_x^{(j)}]$) in order to generate the average likelihood value ($E[B_x]$) on said predefined number (K) of blocks.

20. Apparatus (10) according to claim 19, wherein said processing means (13) are capable of finding the codec (j) associated with the maximum of the likelihood values ($E[B_x^{(j)}]$) generated for each codec (j), this codec (j) representing the maximum likelihood voice codec of the vocal data flow.

* * * * *